Nov. 3, 1942.    E. A. SPERRY, JR    2,300,710
UNIVERSAL FLIGHT INDICATOR
Filed May 4, 1937    4 Sheets-Sheet 1

INVENTOR
Elmer A. Sperry, Jr.
BY Joseph H. Lipschutz
ATTORNEY

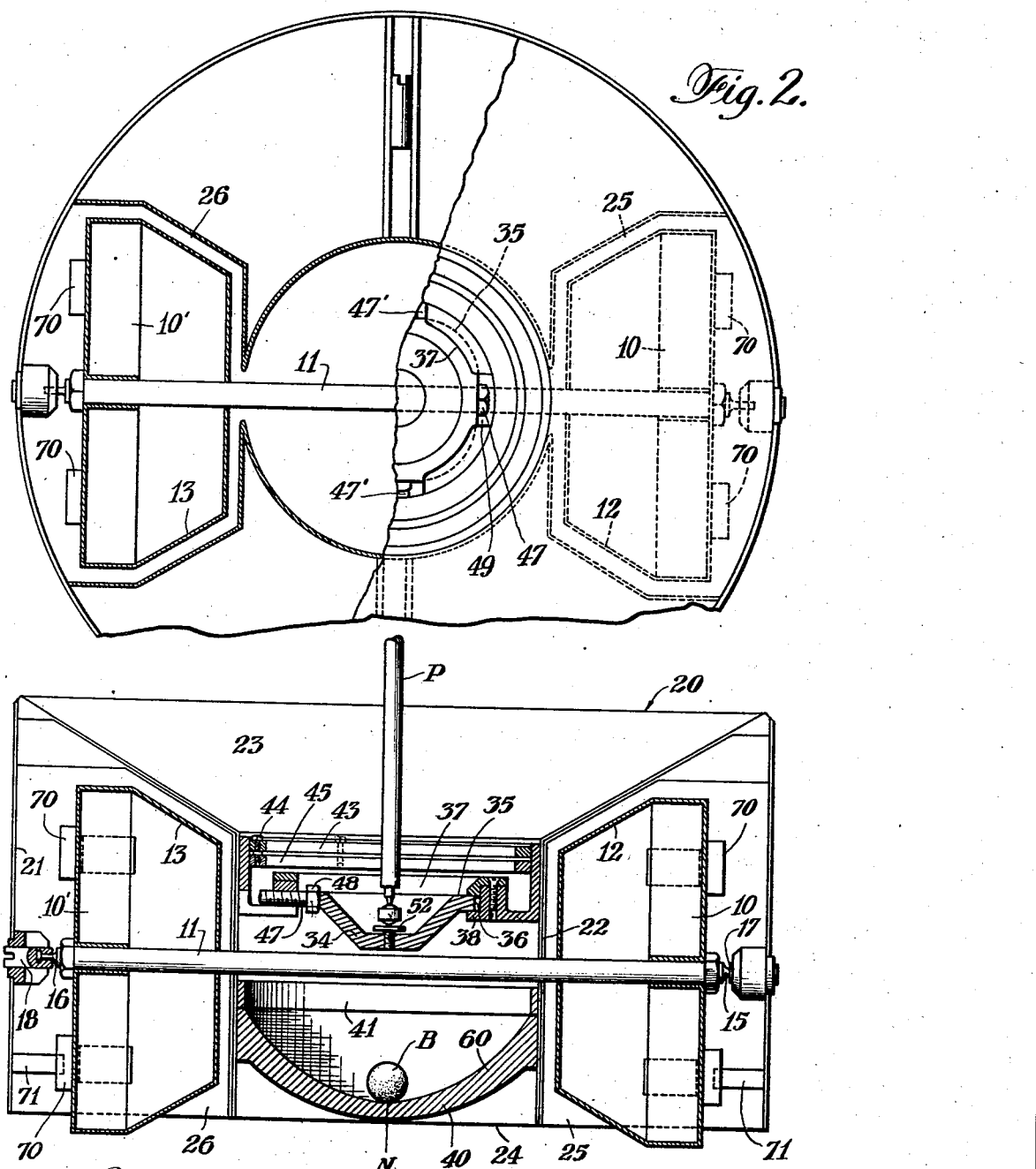

Nov. 3, 1942.   E. A. SPERRY, JR   2,300,710
UNIVERSAL FLIGHT INDICATOR
Filed May 4, 1937   4 Sheets-Sheet 3

INVENTOR
Elmer A. Sperry, Jr.
BY Joseph H. Lipschutz
ATTORNEY

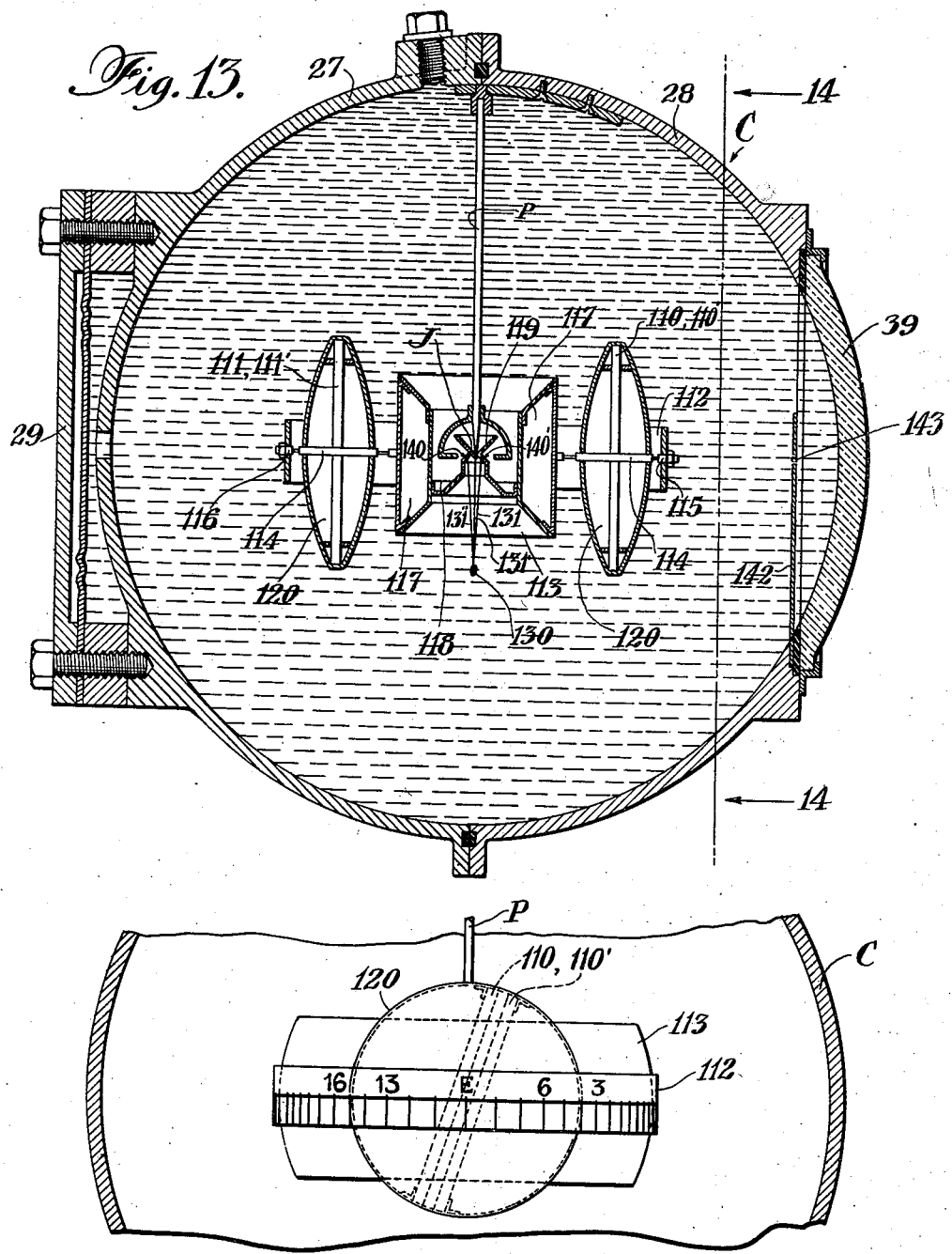

Patented Nov. 3, 1942

2,300,710

UNITED STATES PATENT OFFICE 2,300,710

UNIVERSAL FLIGHT INDICATOR

Elmer A. Sperry, Jr., Brooklyn, N. Y., assignor to Sperry Products, Inc., Brooklyn, N. Y., a corporation of New York Substituted for abandoned applications Serial No. 756,425, December 7, 1934, and Serial No. 46,638, October 25, 1935. This application May 4, 1937, Serial No. 140,650

7 Claims. (Cl. 33—223)

This invention relates to a magnetic compass which, because of its characteristics, may also be utilized on aircraft as a universal flight instrument designed not merely to give improved magnetic compass bearings but also to inform the pilot of direction and attitude of flight. In other words, this magnetic compass, because of its inherent characteristics, performs the functions not only of a magnetic compass but also of an artificial horizon, directional gyro, and inclinometer.

This application is a continuation of my copending applications Serial Nos. 756,425, filed December 7, 1934, and 46,638, filed October 25, 1935, both now abandoned.

It is well known that the standard magnetic compass cannot be used by the pilot of an airplane for the purpose of flying a straight course or making turns, without the aid of other instruments or visual ground references. This is due primarily to two factors, first, the magnetic dip of the magnets is overcome in the standard magnetic compasses by counterweighting one end of the magnet. This gives rise to a gravitational unbalance which renders the heavy end of the needle responsive to acceleration forces. Secondly, the magnetic element must be made pendulous if it is to give a useful indication. This is due to the fact that the magnetic element must give an indication of direction in azimuth and unless the magnetic element is stabilized in a horizontal plane so that its movements take place in substantially said plane, no useful indication would be given by the magnets. The reason for this is that the magnets, if non-pendulous and therefore unstabilized in a horizontal plane, are free to rotate about the axis through the N—S poles. Making the magnetic element pendulous, however, renders this element responsive to every change in speed and direction, giving rise to large errors, sometimes in excess of 180°. Some magnetic compasses, in practice, are made excessively pendulous in order to avoid the necessity of applying counterweights to counteract the dip, but such compasses are subject to the same errors due to change of speed or direction.

The problem consists in introducing in a magnetic compass the necessary pendulous factor so that the said compass may indicate direction in azimuth, and at the same time free the magnetic compass from errors of such magnitude as will render it useless upon changes of speed or turning of the craft upon which it is mounted. Applicant accomplishes this desirable result by so mounting a pendulous element on the magnetic element that the said magnetic and pendulous elements are rigidly connected and act like a rigid pendulum within a predetermined small angle of displacement from vertical or until a predetermined acceleration force acts thereon, whereby stabilization of the magnetic element in azimuth is obtained, but causing the said rigid connection to be broken when said predetermined angle or acceleration force is exceeded whereby further displacement of the pendulous element does not apply an increasing disturbing force on the magnetic element.

The invention has for a further object the provision of an instrument capable of functioning as an attitude of flight indicator independently of direction indication and which will not be substantially affected by acceleration forces.

Further objects and advantages of this invention will become apparent in the following detailed description:

In the accompanying drawings:

Fig. 2 is a plan view of the Fig. 1 device with parts of the casing broken away to disclose the underlying mechanism.

Fig. 3 is a vertical section through the sensitive element comprising the magnetic element and the pendulous element.

Figure 4:
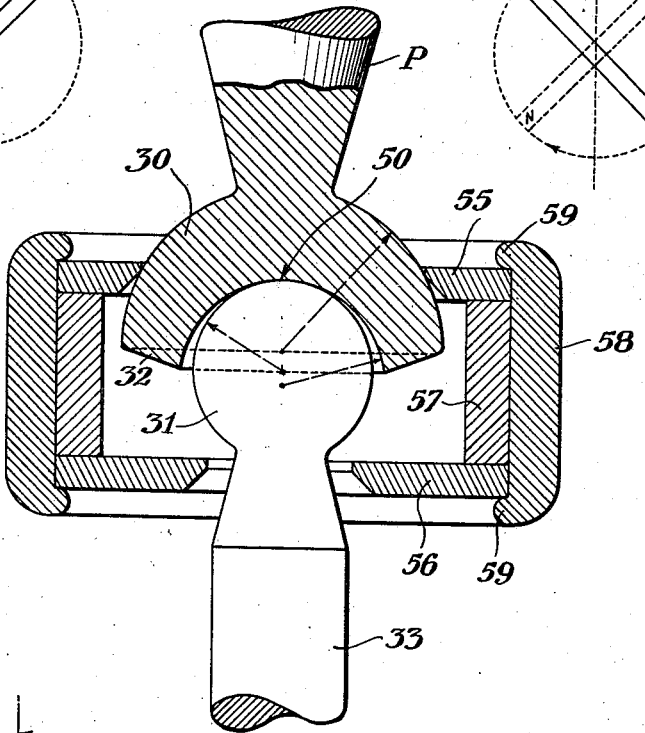
Fig. 4 is a detail of the pivot post whereby the sensitive element is mounted.
Figure 4A:
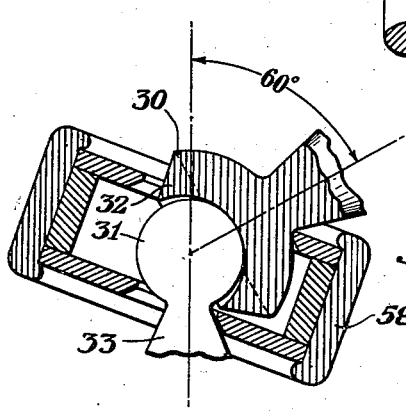

Fig. 4—A is a view similar to Fig. 4 on a smaller scale, showing the parts in a different angular relationship.

Figure 5:
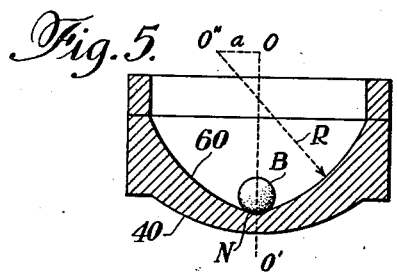

Fig. 5 is a view showing the principle involved in the construction of the cup for supporting the pendulous element.

Figure 6:
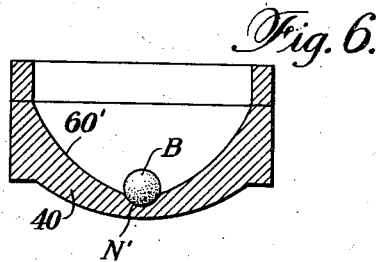

Fig. 6 is a view similar to Fig. 5 showing a modified form of cup for supporting the pendulous element.

Figs. 7 to 11, inclusive, are diagrams illustrating the underlying theory of the invention.

Figure 12:
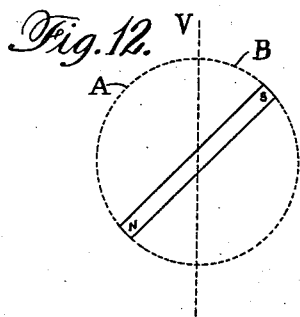
Figure 12A:
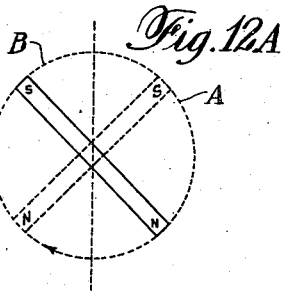

Figs. 12 and 12—A are end views largely diagrammatic, of a portion of the magnetic element of Fig. 2, illustrating the function of the stop mechanism.

Figure 1:
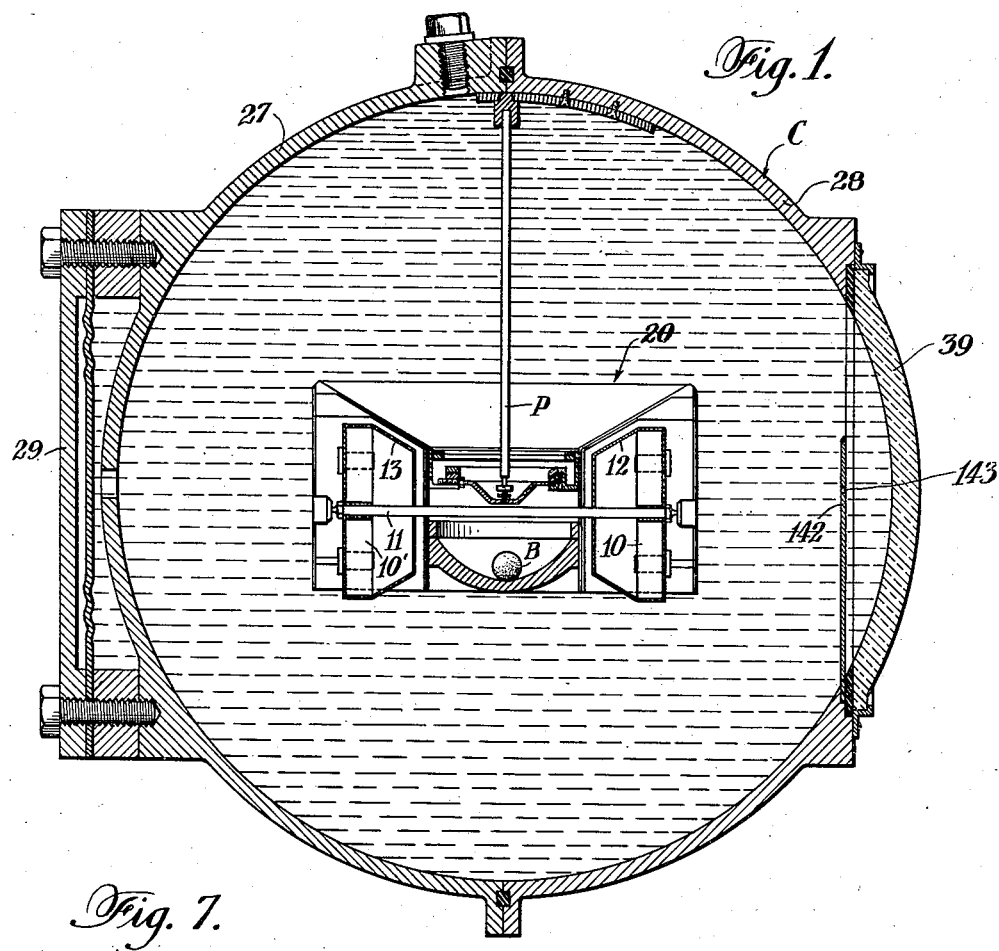
Fig. 1 is a vertical section through a compass embodying one form of the invention.

Fig. 13 is a view similar to Fig. 1 showing another form of the invention.

Fig. 14 is a front view of the sensitive element within the Fig. 13 device.

Referring to the drawings, it will be seen that I have disclosed a type of compass which is free of the defects present in all previous forms of magnetic compass and enables the pilot to fly in any direction and to turn, always directing himself solely by the compass and not relying upon other instruments.

To accomplish the above, I have provided a sensitive element which comprises essentially three parts, first, a magnetic or meridian-seeking element, second, a pendulous element, and, third, means for supporting the pendulous element on the magnetic element. The magnetic element consists of a magnet system and a floating chamber or card element upon which the system is mounted. The magnet system may consist of a pair of magnets 10, 10' fixedly enclosed within closed chambers 12 and 13, respectively. The said chambers are fixedly connected to the shaft 11, so that said shaft is constrained to move with said magnets as the latter change their dip or inclination. The said shaft 11 is mounted for rotation about its axis on pivots 15, 16, journaled in bearings 17 and 18, respectively, said bearings being carried by a cylindrical float chamber 20. The said float chamber consists of an outer cylindrical wall 21, an inner cylindrical wall 22, a top 23 and a bottom 24. The inner cylindrical wall 22 forms a hollow center for the float chamber 20 within which is adapted to be mounted the supporting mechanism. The said inner cylindrical wall 22 is preferably of lesser height than the outer cylindrical wall 21, so that the top wall 23 forms a truncated cone. The float chamber 20 is completely closed except for cavities 25 and 26 (see Fig. 2) in which the magnet float chambers 12 and 13 operate.

The magnetic element, as thus far described, is a buoyant member which is designed to be placed in a container C filled with fluid. Said container may take the form of a sphere consisting of a plurality of parts 27, 28, the part 27 communicating with an expansion chamber 29 to take up variations in the volume of the liquid due to temperature changes, and the part 28 having a window 39 in the front thereof through which the compass readings may be taken. The magnetic element being buoyant, this fact is taken advantage of to support said element against a downwardly extending pivotal bearing 30 at the lower end of a pivot post P fixed in the casing C. For this purpose, the magnetic element is provided with a pivot 31 bearing against a cup 32 formed in pivotal bearing 30. The pivot 31 may take the form of a spherical jewel or metallic member, such as platinum-iridium alloy, operating in cup bearing 32 which is of slightly greater diameter than pivot 31 so that the pivot 31 is internally tangential to cup 32 at substantially a point 50. The said pivot 31 may be formed on the upper end of a post 33 screw-threaded at its lower end into a plate 34 having flanged portion 35 which is supported for movement in a horizontal plane within circumferential groove 36 formed by upper and lower rings 37 and 38 fixedly supported on the inner wall 22 of the float chamber 20. The buoyancy of the float chamber 20 and the mechanism supported thereby is such that the said chamber 20 and all the mechanism supported thereby will be held upwardly in engagement with cup 32 of pivot post P.

The said pivotal connection between pivot 31 and bearing 30 may be enclosed within a retaining casing freely mounted on the bearing cup and comprising upper and lower members 55, 56, surrounding the bearing member 30 and the bearing post 31, respectively, and spaced by space member 57. The members 55 and 56 have openings therein large enough to permit wide angle movement of the sensitive element with respect to post P. Said members 55, 56 and 57 may be held in position by means of cylindrical member 58 having turned edges 59. There is thus formed an enclosing casing for the bearing members 30, 31 which will act to retain the sensitive element in position with pivot 31 in engagement with cup 32 and counteract any tendency for the sensitive element to leave its bearing in response to jars, vibration, and the like. The said retaining casing is freely mounted on the said bearing members so as not to interfere with the relative angular movements of post 33 with respect to post P.

From the above description it will be apparent that we are enabled to obtain a maximum relative angular movement of the sensitive element with respect to pivot post P without disengagement of the parts. This is due to the fact that the pivot 31 is as nearly a complete sphere as is possible, only a minimum portion thereof being utilized for connection to the post 33. The inner surface 32 of cup 30 fits the bearing 31 rather closely and extends down less than half the diameter of the sphere, so that a maximum movement of the sensitive element with respect to the said pivot post P of almost 60° to either side is made possible (see Figure 4—A). This is in contra-distinction to the standard form of magnetic compass where a needle point engages in a shallow cup and after a maximum of 20° displacement the needle slides in the cup and may become completely disconnected. Any tendency of pivot 31 to be dislodged from bearing cup 30 is counteracted by the retaining casing which, however, because of its loose mounting, does not interfere with the relative angular movements of the sensitive element with respect to the pivot post P.

It will now be seen that by the construction thus far described, the magnets 10, 10' are free to assume their natural angle of dip by reason of the fact that they are carried by axle 11 in fixed relation to said axle which is free to rotate about its axis in bearings 17, 18. It is also apparent that the sensitive element as a whole may rotate around a vertical axis through the pivot and bearing. Under these circumstances the magnets have two stable positions with respect to the sensitive element. Ordinarily, the north end of each magnet operates in a vertical semi-circle indicated at A in Figure 12, as the compass travels from the north to the south pole, and the marking on the surface 21 can be read through window 39 in conjunction with lubber line 142. Thus, if the craft is traveling north, the letter N on the card element will be seen through window 39. However, if the sensitive element should for some reason become turned through 180°, then the semi-circle A takes up the position shown in Figure 12—A. This is an unstable position for the magnets, since the north end is pointing south, and the north end of each magnet therefore tends to travel by the shortest route, indicated by the arrow, to the dotted line position where the north end again points north. That is to say, the north end of the magnet tends to swing around the axis 15—16 through the vertical plane into the semi-circle B. Since the north end of each magnet is now pointing north again, this is a stable position, even though the sensitive element and the compass markings are turned through 180°. In other words, if the craft continues to travel north, the south markings on wall 21 will be seen through window 39. The readings are thus 180° in error. To prevent such error from arising, we provide means for confining the north end of the magnet to semi-circle A and the south end to semi-circle B by preventing passage of the ends of the magnets through the vertical line indicated at V which is in reality a vertical plane passed through the dip axis 11 of the magnets. In other words, the north end cannot, in Fig. 12—A, travel the course indicated by the arrow into the semi-circle B. For this purpose we provide on the float chamber 20 within the cavities 25, 26 in which the magnets operate, a stop 71 in each of said cavities, which stop is so positioned that it will engage one of a set of lugs 70 carried by each float chamber 12 and 13 in which the magnets are housed. The stops and lugs are so positioned that the stops will engage one or the other of the lugs of each set before the end of the magnet can pass through the said vertical plane through the pivotal axis of the magnets. Therefore, should the sensitive element become turned through 180°, there is no way by which the north end of the magnets can again indicate north except by turning through 180° in azimuth and necessarily carrying the sensitive element through 180° in azimuth to its original settling position.

Thus the sensitive element is freed of the first of the two objectionable features present in ordinary magnetic compasses, namely, the gravitational instability which is caused by placing weights on one arm of the pivoted magnet in order to bring said magnet into the horizontal position, and therefore there is avoided the error which present magnetic compasses are subject to by reason of the action of acceleration forces on the offset weight.

As stated hereinbefore, it is necessary that any magnetic meridian seeking element be stabilized in the horizontal plane, and this is effected by rendering the same pendulous. The pendulous element here employed may comprise a ball B which is supported on the magnetic element by a circular cup 40 which is fixed in position on inner wall 22 so as to close the lower end of the hollow center formed in float chamber 20. The said cup 40 may be fixed in position in said hollow interior by means of ring 41. The ball B operates on the surface 60 of cup 40 and imparts the necessary pendulosity to the entire sensitive element so that it is stabilized in a horizontal plane. However, the weight of the sensitive element as a whole including the pendulous element B is still such that it is less than the weight of the displaced fluid, and therefore the sensitive element will be held against the cup 32 at the end of pivot post P. However, the buoyancy is such that the sensitive element will touch the point of tangency 50 in the said cup 32 with a pressure which is the minimum necessary to ensure engagement so that pivot friction is reduced to a minimum.

It is essential for the proper operation of this type compass that the center of gravity and center of buoyancy of the magnetic element and cup 40 shall coincide. For this purpose, the adjusting screw 18 may be utilized, the said screw supporting the journal portion 16 carried by shaft 11. This, however, shifts the center of gravity only in one of three essential directions, and for the other direction in the horizontal plane small masses of metal may be placed upon the cylindrical wall 21 to effect the necessary balance and if desired such masses of metal may be used in the direction of axis 11 also. In the third direction, the center of gravity is adjusted by means of a ring 43 which may be operated vertically by a plurality of adjusting screws 44 extending through said ring and threaded into grooves in a ring 45 fixed to the inner wall 22. When the float chamber 20 with all of the elements supported thereby, except the pendulous element B, and with the magnets demagnetized, is suspended in the liquid and it remains in whatever position it is placed, then the center of gravity and the center of buoyancy coincide. The said adjustments and placing of weights are continued until such coincidence of the center of gravity and center of buoyancy is effected.

It is next necessary to cause the center of gravity and center of buoyancy of the magnetic element and cup 40 to coincide substantially with the center of pivot 31. For this purpose, the sensitive element may be adjusted in two ways in the horizontal plane by means of pairs of screws 47, 47' having heads 48 abutting against member 34 in grooves 49 formed in the flanged portion 35 of said member. Two pairs of screws are shown in quadrature so that any desired adjustment in a horizontal plane along two axes at right angles to each other may be effected to cause substantial coincidence of the center of pivot 31 with the center of gravity and center of buoyancy in the vertical axis through post 33. This is accomplished by loosening up on one screw of a pair and tightening the other screw of said pair. However, the said center of gravity and center of buoyancy may be above or below the center of pivot 31, and in order to make them substantially coincide a vertical adjustment may be effected by screwing post 33 into or out of member 34. For this purpose, the said post may be provided with a toothed wheel 52 on a screw threaded into plate 34, whereby turning of wheel 52 effects raising or lowering of the float chamber 20 until the said center of gravity and center of buoyancy substantially coincide with the center of pivot 31. Proof of coincidence is obtained when the sensitive element (exclusive of ball B but including support 40, and with the magnets demagnetized,) retains any position in which it may be placed on cup 30.

When such coincidence has been effected, the pendulous element B is placed in cup 40. The exact degree of pendulosity is thus known, and in the present case such pendulosity is of the very minimum amount. This amount may be stated as being just sufficient to overcome pivot friction of the sensitive element so that it may be maintained in a horizontal plane.

As thus far described, the sensitive element, consisting of the magnetic meridian-seeking element, the pendulous element, and the support therefor, constitutes a very slightly pendulous magnetic compass. The fact that the pendulosity of the sensitive element is very slight, being only sufficient to enable it to overcome pivot friction and maintain itself in a horizontal plane, will prevent any great errors from being introduced in response to acceleration forces, the said term "acceleration forces" being used here in its broadest sense to include change of speed in a straight line or turning in any direction. Furthermore, in addition to reducing the error due to pendulosity by making the pendulous factor the minimum essential quantity, such error in response to acceleration forces is further reduced by making the inertia of the sensitive element around its horizontal axes sufficient so that said element remains substantially unresponsive to all disturbing forces around said horizontal axes except those of long period.

The compass as thus far described has made provision for three important means for eliminating errors due to acceleration. These are as follows:

1. The magnets are free to take up their natural angle of cup and therefore no counterweighting is necessary and therefore no acceleration errors due to this gravitational unbalance are possible.

2. The pendulosity of the sensitive element has been reduced to such a minimum that there is only sufficient pendulosity to overcome the friction in the bearings, and therefore the errors due to such pendulosity are held to a minimum.

3. The inertia of the sensitive element has been made so great that the said element will not be substantially affected by short period disturbing forces.

Figure 7:
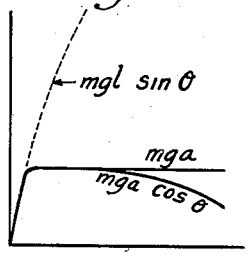
Figure 8:
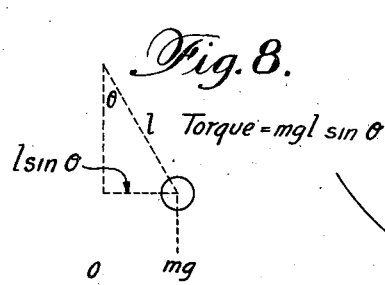
Figure 9:
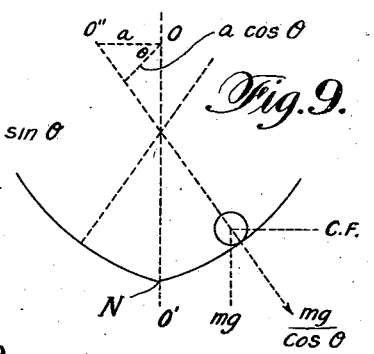

In spite of all the above steps to reduce the errors caused by acceleration forces, the fact remains that the sensitive element, being pendulous, although only slightly so, would normally respond to large acceleration forces, were it not for the fact that we make provision for eliminating the possibility of such errors. For this purpose, we provide means for uncoupling the pendulous element from the magnetic element when the said pendulous element has been displaced from the vertical beyond a predetermined, relatively small, critical angle, or whenever the disturbing forces such as acceleration forces, acting upon the pendulum exceed a predetermined force. For this urpose, the inner surface 60 of cup 40 is formed as shown in Figure 5, not as a true sphere but as a surface of revolution formed by rotating an arc of a circle of radius R around an axis O—O'. The point O coincides with the center of pivot 31. As a result, there is formed in the extreme lowest point of the cup a notch or depression N in which the ball B will lodge until a force of sufficient magnitude dislodges it or until the cup 40 is displaced a sufficient angle to cause the said ball to roll out of the notch on to the smooth surface 60. As long as the ball B remains in the notch N the entire sensitive element moves as a unit and operates as a simple pendulum obeying the law of the simple pendulum as shown in Figure 8. Thus, if the angle of displacement is $\theta$, the length of the pendulum $l$, and the weight of the ball indicated as $mg$, then the restoring torque equals $mgl \sin \theta$, and the greater the angle of displacement the greater is the restoring torque, so that if plotted as a graph, as shown in Figure 7, a sine curve results. However, as soon as the acceleration force increases sufficiently to cause the ball to leave the notch, the ball and cup cease to act as a unit and the restoring torque no longer follows the famliar $mgl \sin \theta$ curve. Referring to Figure 9, we see that the disturbing torque is $$\frac{mg}{\cos \theta} \times a \cos \theta$$

and as a result the disturbing torque$=mga$. From this we see that once the ball leaves notch N it applies a constant torque to the cup, and, hence, to the magnetic element, equal to $mga$ which is independent of $\theta$ and therefore independent of the size of the acceleration force. Plotting this result graphically in Figure 7, we find that a horizontal line results, indicating constancy of torque. The above result is not surprising because we know that a ball operating on a cup which is perfectly spherical exercises no torque thereon because the resultant force always acts through the center O no matter how far the ball is displaced (see Figure 10) and therefore the ball exerts no torque on the cup. The reason that in Figures 7 and 9 a constant torque prevails after the ball leaves the notch N in the cup, rather than zero torque as in the Figure 10 form, is that O" (the center of the arc) in Figure 5 is displaced from O, O( (the axis of revolution) the distance equal to $a$.

Figures 10, 11:
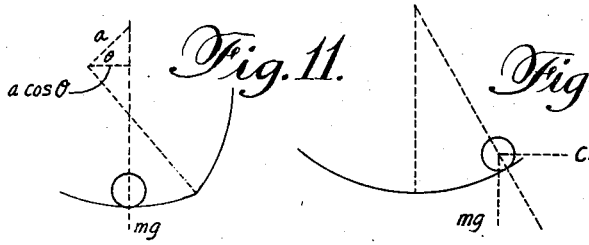

When the cup is displaced angularly from vertical without centrifugal force being present, the ball will leave the notch N after a few degrees, as shown in Figure 11. In this case, the restoring torque is $mg \times a \cos \theta = mga \cos \theta$. This is a maximum when $\theta$ is zero and is zero when $\theta$ is 90°. The restoring torque, therefore, operates in accordance with the sine curve (see Figure 7) until the ball leaves the notch and thereafter the torque falls off, as the angle of displacement from vertical increases, in accordance with the formula $mga \cos \theta$.

The distance $a$ which center O" is displaced from O is such that $mga$ (the maximum torque which the ball will transmit to the magnetic element) is just sufficient to overcome pivot friction. In practice, this is found to be such that when the cup is displaced from the vertical about 5° the ball will leave the notch N. This means that within 5° from vertical the ball and cup act like a rigid pendulum to provide the necessary pendulosity on the compass to maintain the compass in a horizontal plane so that direction in azimuth may be indicated, but that beyond this angle (or when a centrifugal force equal to or greater than $mga$ is applied) the ball rolls freely on the cup and the torque which it applies to the cup will not be further increased. The force $mga$ which the ball may apply to the cup, and therefore to the magnetic element is so slight (being only sufficient to overcome pivot friction) that large acceleration forces will not introduce any substantial error.

Instead of the notch N formed by the surface of revolution, a detent N', as shown in Figure 6, may be employed. The groove N' and the steepness of the surface of revolution are such that ball B will be dislodged from said groove by the same acceleration force which will cause it to leave notch N.

In this manner, applicant has solved the problem of providing the necessary pendulosity to render a magnetic compass operative without laying the compass open to the substantial errors due to acceleration forces acting upon the pendulous factor, which errors have in the past been of such magnitude as to render the compass ineffective for the purpose of guiding the flight of a craft.

The usual airplane compass markings are placed on the outer surface of wall 21 of the card element and are read in conjunction with lubber line 142 supported by the casing back of window 39.

Another embodiment of the invention which operates upon the same principle and yields the same desirable results is illustrated in Figures 13 and 14.

Within the same casing C having the same pivot post P, there is mounted a buoyant sensitive element consisting of the same two fundamentals, namely, a magnetic meridian-seeking element and a pendulous element. The form disclosed in Figures 13 and 14 differs from the form already described only in the respect that the buoyant members are of somewhat different construction and the pendulous element differs from the type of pendulous element hereinbefore described.

The magnetic element comprises sets of magnets 110, 110' and 111, 111' which are mounted between ring 112 and a float chamber 113. Said mounting may be accomplished by means of pivot pins 114 pivoted at 115 and 116 to the ring and to the float chamber, respectively. The said float chamber 113 may comprise one or more float type compartments 117. The center of the float is hollow and provides a support 118 for the cup 119 within which the jewel support is fixed. The magnets 110, 110' and 111, 111' may also be enclosed within float chambers 120, said shafts 114 extending through the said float chambers 120. The entire magnetic meridian-seeking element is of such dimensions and values that it is designed to float in the liquid which fills the casing C, so that jewel J will rest firmly against the end of pivot post P.

It will be observed as in the Figure 1 form of the invention that the magnets are free to take up their natural angle of dip by pivoting around pivots 115 and 116. Thus there is no need for weighting one end of each magnet and hence the acceleration which arose by reason of the weighting of one end of the compass as heretofore employed, is avoided. The entire magnetic meridian-seeking element as heretofore described is non-pendulous and is adjusted so that the center of buoyancy and the center of gravity coincide at the pivotal point J.

The pendulous factor in this case consists of a pendulous mass 130 attached to the magnetic element by means of connections 131, 131', 131''. The weight of the mass 130 is, however, the absolute minimum amount which, acting through the members 131, 131', 131'', will overcome the friction in the bearings and stabilize the sensitive element in the horizontal plane. This amount is exceedingly small. This means that the effect of acceleration forces upon the said pendulous mass will be very slight.

Not only is this pendulous mass which is necessary to stabilize the magnetic element in a horizontal plane of exceedingly small dimensions, but provision is made whereby the maximum gravity and acceleration forces transmitted by the pendulous element to the magnetic element are but a small fraction of the gravity and acceleration forces which may act on the pendulum. For this purpose, we connect the pendulous mass 130 to the magnetic element, not by a rigid connection, but by a yielding connection. Thus, in the form shown in Figure 13, the pendulous mass is connected to the magnetic element by a plurality of threads 131, 131', etc. which are connected to the magnetic element at points such as 140, 140', etc.

With the above construction it is found that the set of threads 131, 131', etc. act like a rigid member within a small angular displacement either side of the settling position, that is to say, for two or three degrees either side of the vertical the said threads act like a rigid unit to give the maximum centralizing effort. Within this range, forces acting upon the pendulum follow the line $mgl \sin \theta$ portion of the curve of Figure 7, and thus the full centralizing effect of the pendulum is transmitted to the sensitive element. When this small critical angle is exceeded, however, then certain of the flexible connections become limp and the remaining connection, which is the only taut one, pivots around its point of connection 140 or 140', etc. so that the force is no longer transmitted through the lever 131, 131', etc. but through the short arm from the pivot J perpendicular to the taut flexible connection. In other words, as soon as the critical angle is exceeded, the pendulous mass which within the critical angle was rigidly connected to the magnetic element now becomes loosely coupled to said magnetic element and the force applied by the mass to the magnetic element flattens out in accordance with the $mga$ portion of the curve of Figure 7. It will thus be apparent that the principle embodied in the Figure 13 form of the invention is the same as in the Figure 1 form of the invention. The rigidity of the threads within the critical range corresponds to the lodgment of the pendulous ball B in the notch N of the Figure 1 form, and the pivoting of the threads around their points of connection 140, etc. constitutes the loosely coupled connection corresponding to the movement of ball B out of notch N.

In the Figure 13 form of the invention the scale markings are carried on the outer surface of ring 112 as shown in Figure 13, while in the Figure 1 form of the invention the scale markings are carried by the outer wall 21 of the float chamber 20. A lubber line 142 may be fixed in position back of front window 39.

In both forms of the invention described hereinbefore it will be apparent that the float is not appreciably affected by acceleration forces. Therefore, each of these forms can be used as an attitude-of-flight indicator in the form of an artificial horizon and inclinometer at the same time as these instruments indicate direction. For this purpose, horizontal lubber line 143 coincides with the horizontal mark on the float. If direction indication is not desired, the magnets may be replaced by unmagnetized masses of the same magnitude, and the device will function as an attitude-of-flight indicator independently of direction indication. This is apparent from the fact that the entire float element is slightly pendulous, but because of the fact that the pendulum is loosely coupled to the floating mass in response to acceleration forces in excess of the predetermined magnitude, the device is substantially unaffected by acceleration forces and therefore is not subject to the errors which have heretofore characterized pendulous artificial horizons and inclinometers.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device of the character described adapted to be mounted on an aircraft, a sensitive element, means for supporting said sensitive element for universal pivotal movement, said sensitive element including a magnetic direction-seeking element, a pendulous element, and means for supporting said pendulous element on said magnetic element, said last named means including a cup carried by said magnetic element and having an inner surface of revolution, said cup supporting said pendulous element for movement upon said inner surface, said inner surface having detaining means for normally retaining said pendulous element in place up to a predetermined small angle of tilt.

2. In a device of the character described, a casing having fluid therein, a bearing carried by said casing, a buoyant sensitive member supported in said fluid against said bearing for universal pivotal movement, said member comprising a magnetic element, a pendulous element, and means for supporting said pendulous element on said magnetic element, said magnetic element including a float chamber, a shaft rotatably supported in said chamber and having its axis lying in a vertical plane through said bearing, and a plurality of magnets fixed to said shaft on opposite sides of said bearing.

3. In a device of the character described, a casing having fluid therein, a bearing carried by said casing, a buoyant sensitive member supported in said fluid against said bearing for universal pivotal movement, said member comprising a magnetic direction-seeking element, a pendulous element, and means for supporting said pendulous element on said magnetic element, said magnetic element including a float chamber, a straight horizontal shaft rotatably supported in said chamber below said bearing and having its axis lying in a vertical plane through said bearing, and a plurality of magnets fixed to said shaft on opposite sides of said bearing.

4. In a device of the character described, a casing having fluid therein, a bearing carried by and within said casing, a buoyant sensitive member supported in said fluid against said bearing for universal pivotal movement, said member including a magnetic direction-seeking element and a pendulous element, said magnetic element including a float chamber, a shaft rotatably supported in said chamber, a plurality of magnets fixed to said shaft on opposite sides of said bearing, means whereby said member exclusive of said pendulous element may be gravitationally and hydrostatically balanced to cause its center of gravity and center of buoyancy to coincide, and means whereby said point of coincidence may be made substantially coincident with the point of support of said member on said bearing.

5. A direction indicator including, in combination with a container having a smoothly spherical interior surface, a fluid substantially filling said container, a freely rotatable member hydrostatically supported in said fluid, and a magnet pivoted upon said member to rotate with respect to said member in a normally vertical plane and automatically to align the magnet poles with the dip of the earth's magnetic field and to orient said member to a desired position in azimuth.

6. A device for stabilizing direction indicators with respect to gravity while reducing the disturbing effect of acceleration forces thereupon, including a relatively non-pendulous member rotatable about any axis normal to the direction of stabilization, a small unattached mass for supplying the principal effective pendulosity of said member, and a cam having a concave spheroidal surface, forming a part of said member, for supporting said mass and converting radial pressure due to action of the stabilizing force and other acceleration forces upon said mass into torque upon said member in a desired proportion to the angle separating the direction of said other forces from the normal stabilization axis of said member, said mass being freely movable over said cam surface, and said cam surface having one portion most remote from its spheroidal center into which said mass falls in the absence of said other acceleration forces.

7. In a magnetic compass, a casing, a sensitive element mounted within said casing for universal movement with respect thereto, comprising a support and a direction-seeking magnet pivoted on said support for movement about a transverse normally horizontal axis, said support being formed with a cam surface of revolution generated by rotating an end portion of an arc of a conic section about the chord thereof, said chord being normally vertical, the full arc of said portion extending less than 180°, and a free mass supported on said surface and acting thereon to normally urge said support into a position to maintain horizontal the axis of said magnet.

ELMER A. SPERRY, Jr.